United States Patent [19]

Yang

[11] Patent Number: 5,600,191
[45] Date of Patent: Feb. 4, 1997

[54] DRIVING ASSEMBLY FOR MOTOR WHEELS

[76] Inventor: Chen-Chi Yang, P.O. Box 10780, Taipei, Taiwan

[21] Appl. No.: 359,027

[22] Filed: Dec. 19, 1994

[51] Int. Cl.6 .............................. H02K 7/00; B60K 1/00
[52] U.S. Cl. .................. 310/67 R; 310/92; 310/100; 310/154; 310/237; 180/65.5
[58] Field of Search ................ 310/67 R, 67 A, 310/78, 83, 92, 99, 100, 154, 237; 180/65.5

[56] References Cited

U.S. PATENT DOCUMENTS

| | | | |
|---|---|---|---|
| 2,483,177 | 9/1949 | Bobard | 180/10 |
| 2,505,770 | 5/1950 | Hill | 310/67 R |
| 2,506,146 | 5/1950 | Gladish | 310/67 R |
| 2,514,460 | 7/1950 | Tucker | 310/67 R |
| 4,346,777 | 8/1982 | Restelli | 180/220 |
| 5,115,159 | 5/1992 | Takamiya et al. | 310/67 A |
| 5,268,602 | 12/1993 | Schwaller | 310/67 A |
| 5,450,915 | 9/1995 | Li | 180/65.5 |
| 5,465,802 | 11/1995 | Yang | 180/65.5 |

*Primary Examiner*—Thomas M. Dougherty

[57] ABSTRACT

A driving assembly for motor wheels including a plurality of permanent magnets arranged around the outer periphery of a securing element on an axle for forming a stator. When electric currents are passed through a plurality of winding coils in an inner wheel frame, an induction electromagetic field is generated to drive the inner wheel frame in the outer wheel frame to rotate. The inner wheel frame has a clutch ring for transmitting the power of the inner wheel frame to a driving gear of a reduction mechanism to drive the outer wheel frame. A clutch element is disposed between the clutch ring and the driving gear, the clutch element being capable of axial movement along the axis of said axle for controlling power transmission.

5 Claims, 5 Drawing Sheets

DRIVING ASSEMBLY FOR MOTOR WHEELS

BACKGROUND OF THE INVENTION (a) Field of the Invention:

The present invention relates generally to a driving assembly for motor wheels, and more particularly to an improvement in a clutch device wherein an axle of the wheel remains immobile.

(b) Description of the Prior Art:

The inventor of the present invention previously filed an application in the United States on Aug. 5, 1994 under Ser. No. 08286349 for a wheel driving assembly wherein the wheels are driven by an induced electromagnetic field and the axle of the wheel remains immobile. Such a wheel driving assembly is suited for vehicles driving up slopes or travelling at low speeds.

The above-mentioned previous invention provides a comprehensive design to solve existing drawbacks in electric wheels. Said invention includes a rotary printed-circuit board type conductive plate which acts as a commutator so that the outer peripheral winding coils may obtain power supply. The above-mentioned invention includes a feature which is unprecedented in the art, that is, the arrangement of a stator on the axle and which may rotate with a rotor in the hub to interrupt the electromagnetic field induction between the stator and the rotor if necessary, in occasions such as the batteries are depleted and the vehicle has to be pushed manually. Hence, a clutch device is disposed in the immobile portion of the axle and the stator to control rotation of the stator. In the previous invention, a drum type brake element is used as the clutch device to stop the stator from rotating. In such a configuration, the clutch device controls the stator by means of radial movements. The present invention, however, provides a clutch device which controls movement of the rotor by means of axial movements. If occasions arise, the rotor (inner wheel frame) may not rotate with the hub (outer wheel frame).

SUMMARY OF THE INVENTION

A primary object of the present invention is to provide a clutch device for wheel driving assemblies, wherein the clutch device may generate an axial movement which is parallel to the axle of the wheel, so that the stator in the induced electromagnetic field may or may not rotate with the outer wheel frame.

In the clutch device for use in electric wheel driving assemblies according to the present invention, the clutch device for transmitting power may perform axial movement. In the present invention, the stator is coupled with a securing element of the axle, and a plurality of permanent magnets are disposed around the outer periphery thereof. An inner wheel frame is provided around the stator and which may rotate around the axle. The inner wheel frame has disposed therein a plurality of winding coils which form a rotor; when an electric current is passed therethrough, the rotor and the stator generate an induction electromagnetic field to rotate the inner wheel frame. The outer periphery of the inner wheel frame is provided with an outer wheel frame which, if necessary, may be used to secure the tire. The center of the inner wheel frame has secured thereon a clutch ring pivotally provided on the axle. The clutch ring may rotate around the axle; besides, it may bring the inner wheel frame to reciprocate in a direction parallel to the axis of the axle. Power for the inner wheel frame is transmitted via a reduction mechanism to the outer wheel frame. The driving gear of the reduction mechanism is pivotally on the axle, and the driving gear is in contact with the clutch ring by means of a clutch element, so that power of the inner wheel frame may be transmitted via the clutch element to the outer wheel frame. Certainly, when the clutch element is released, power transmission is not possible.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 1:
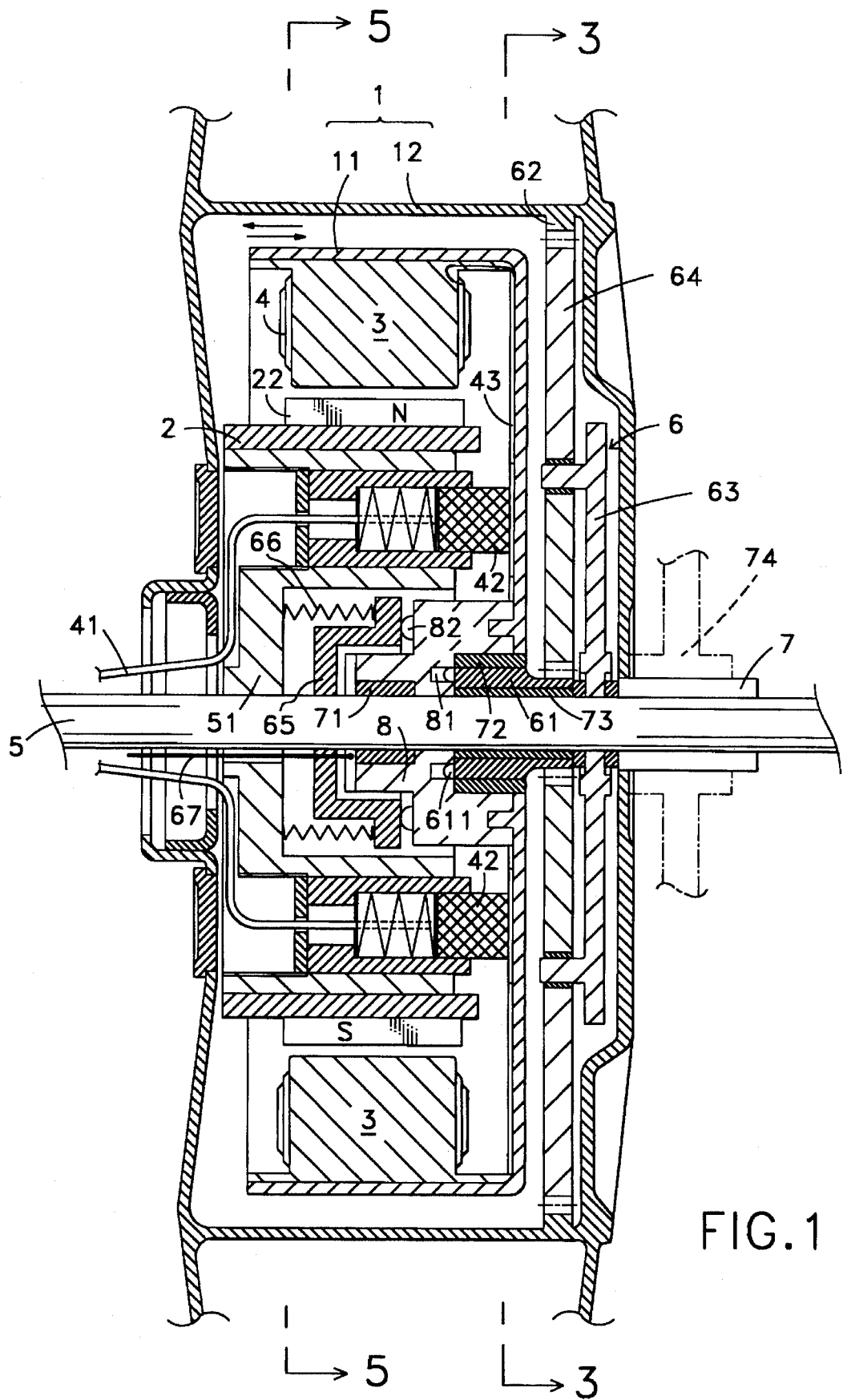
FIG. 1 is a sectional view of a first preferred embodiment of the present invention.

With reference to FIGS. 1 to 5, the present invention comprises a stator 2 disposed on a axle 5, the stator consisting of a plurality of permanent magnets 22 radially spaced apart, and a plurality of conductive elements, preferably carbon brushes 42, axially fastened onto a securing element 51 of the axle 5 and which are parallel to the axle 5; the axle is preferably a solid axle so that the diameter thereof may be reduced to the greatest extent, but the rigidity thereof must be maintained. The device according to the present invention further comprises an annular printed-circuit board 43 fixed on the wheel frame and pivotally disposed on the axle 5 with the wheel frame. The printed-circuit board 43 has two groups of conductive sheets 46 and 47 radially disposed thereon (see FIG. 3 to 4). These conductive sheets 46 and 47 are severally disposed in an inner area and outer area of one side of the printed-circuit board 43. Each conductive sheet 46 in the inner area exposes on one side of a body 44, wherein each conductive sheet 46 is connected to the corresponding conductive sheet 47 disposed in the outer area and concealed in the insulated body 44. The conductive sheets 46 in the inner area contact the above-mentioned carbon brushes 42. The present preferred embodiment further comprises a bearing pivotally disposed on the axle 5 for use as a hub for supporting a wheel frame 1. The interior of the wheel frame has a plurality of radially distributed winding coils 4 which correspond to the permanent magnets 22, thereby forming a rotor 3 corresponding to the stator 2. Each winding coil 4 is connected to one of the conductive sheets 47 in the outer area of the printed-circuit board 43. The wheel frame is fixed with the printed-circuit board 43 and may rotate therewith on the axle 5. During rotation, the air currents generated by the rotating wheel frame may help to dissipate the heat of the winding coils 4 rapidly. The clutch device according to the present invention further comprises a power supply element 41, such as a cable, attached onto the securing element 51 of the axle 5 for transmitting power via carbon brushes 42 and the printed-circuit board 43 to the winding coils 4 in the interior of the wheel frame, so that the winding coils 4 may generate an electromagnetic field with the permanent magnets 22 on the stator 2, causing the wheel frame 1 to rotate around the axle 5.

The above-described device is a basic and typical example of the present invention. It may smoothly transmit power from the vicinity of the axle 5 via the carbon brushes 42 and the annular printed-circuit board 43 to the winding coils 4 of the rotor 3. Additionally, the above-described device is easy to manufacture and assemble.

Besides, the above-mentioned wheel frame may be formed by an outer wheel frame and an inner wheel frame so that the device according to the present invention is more suited for wheel-chairs, bicycles, low-speed vehicles, etc. A reduction mechanism 6 is shown in FIG. 1. Although it consists of a planetary gear set, those skilled in the art know that the so-called reduction mechanism referred to herein may be selected from gear type, pulley type, or other type of reduction mechanism. It should be understood that the reduction mechanism is not restricted to the preferred embodiment disclosed in FIGS. 1 and 2. As is mentioned above, the wheel frame of the clutch device according to the present invention further comprises an outer wheel frame 12 on the axle 5 and an inner wheel frame 11 pivotally disposed on a bearing 72. The inner wheel frame 11 has a plurality of winding coils 4 disposed therein, and the inner wheel frame 11 is secured to the printed-circuit board 43 to rotate therewith. The above-described outer wheel frame 12 is used as a hub for supporting the motor wheels. The above-mentioned reduction mechanism 6 is provided between a lateral side of the inner wheel frame 11 and the outer wheel frame 12, the reduction mechanism 6 having a driving gear 61 pivotally provided on a bearing 73, an idle gear 64 pivotally disposed on a link 63 and a driven gear 62 disposed on the outer wheel frame 12. The driving gear 61 of the reduction mechanism 6 is driven by the inner wheel frame 11 (by means of the clutch device, to be described hereinafter). The outer wheel frame 12 is coupled to the driven gear 62 of the reduction mechanism 6 so that the power generated when the inner wheel frame 11 rotates may be reduced by the idle gear 64 of the reduction mechanism 6 to be transmitted to the outer wheel frame 12.

Figure 2:
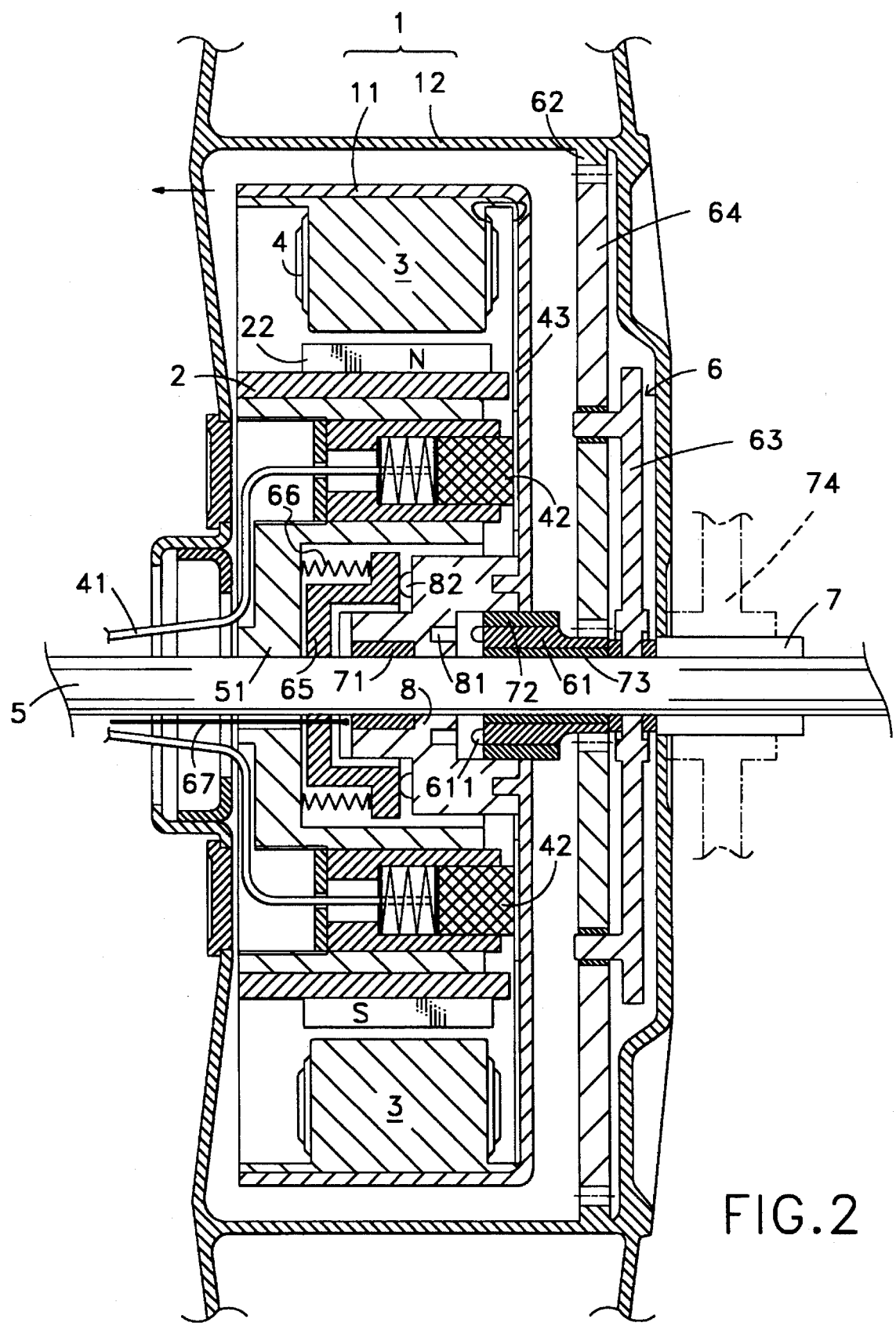
FIG. 2 is similar to FIG. 1, but showing the preferred embodiment in a different state.
Figure 3:
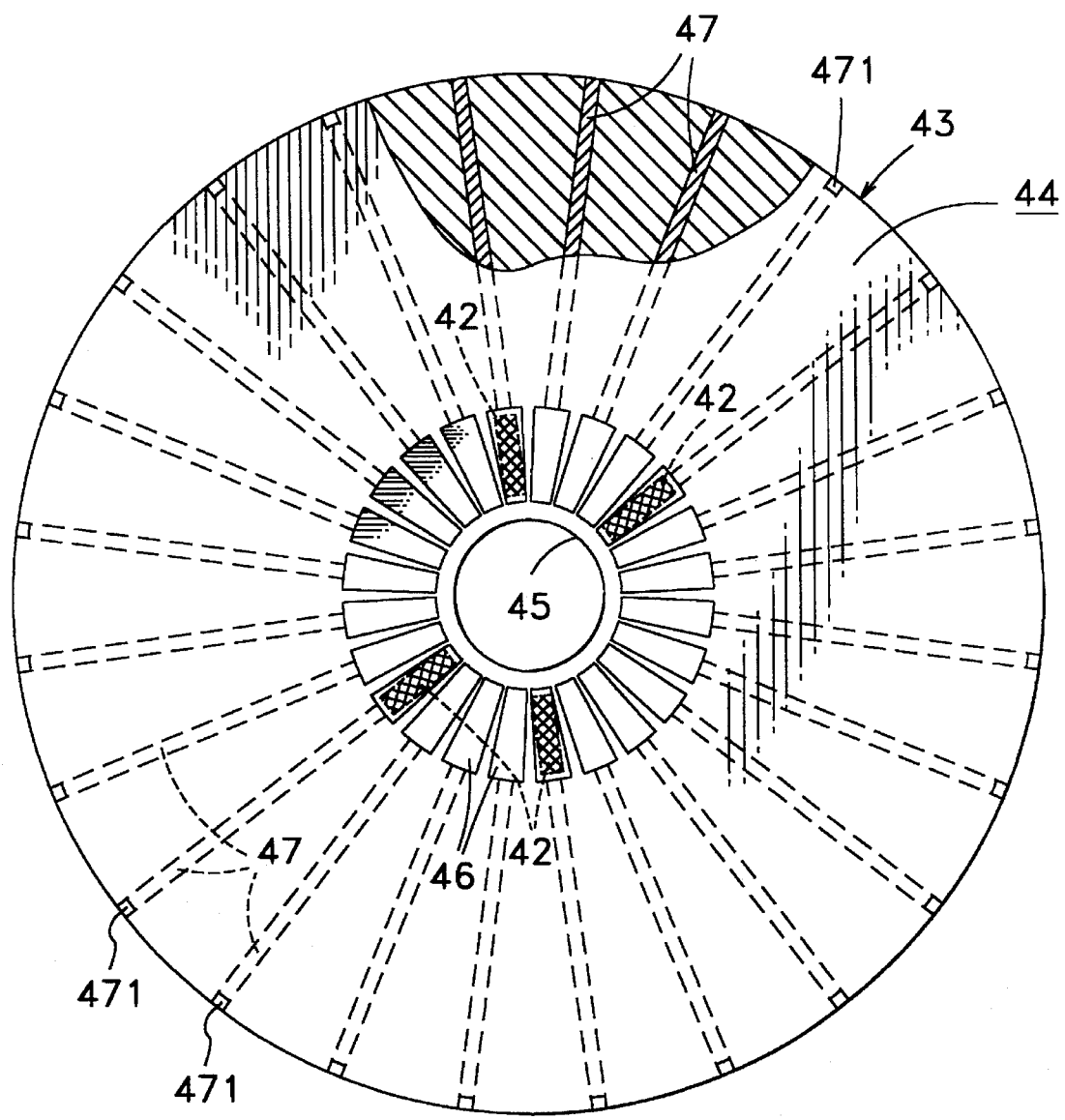
FIG. 3 is a sectional view cut along line 3—3 of FIG. 1, showing the annular printed-circuit board.
Figure 4:
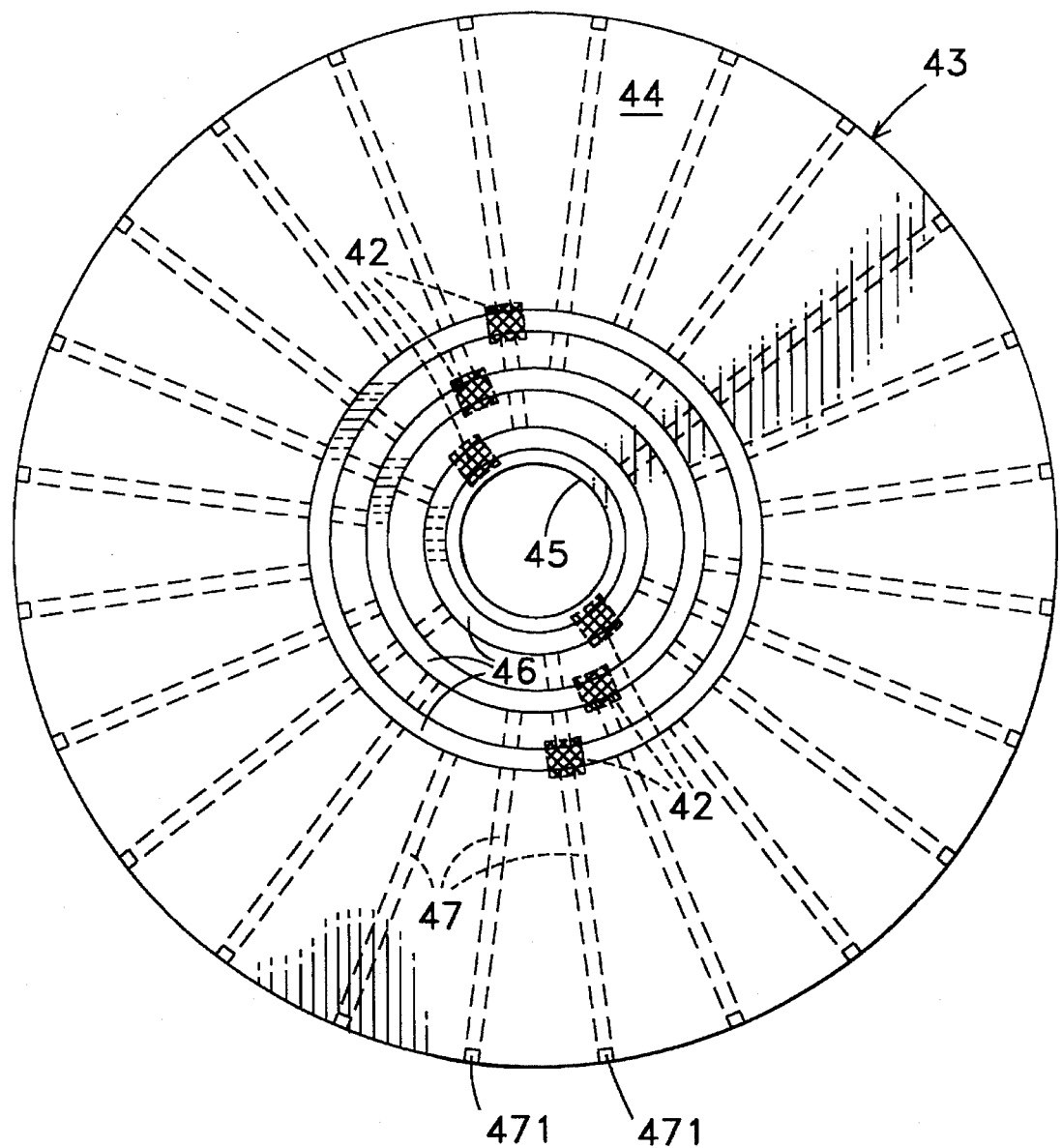
FIG. 4 is similar to FIG. 3, but showing another preferred embodiment.
Figure 5:
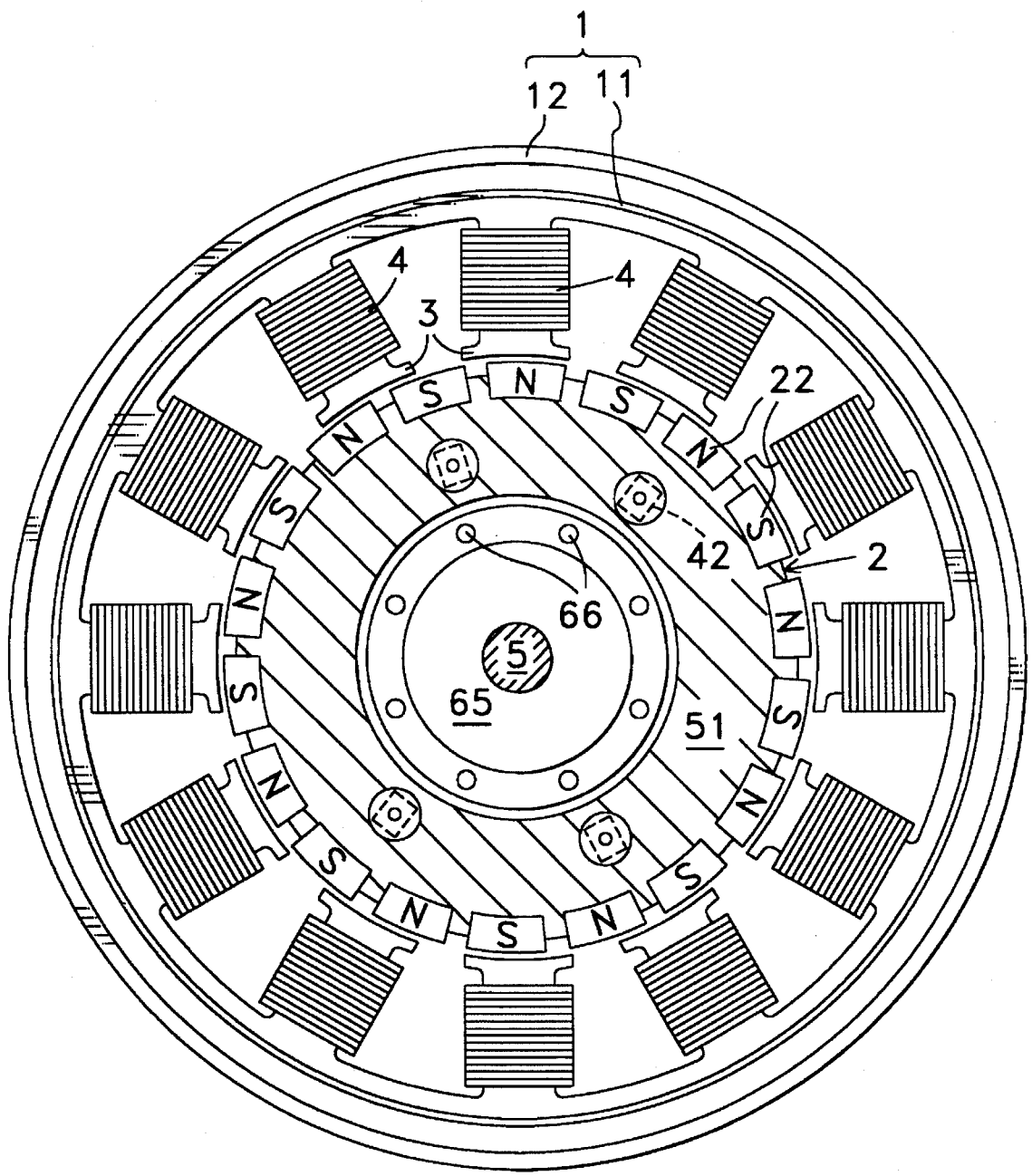
FIG. 5 is a sectional view taken along line 5—5 of FIG. 1.

The present invention is characterized in that the inner wheel frame 11 is fixed on a clutch ring 8 pivotally disposed on the axle 5. The clutch ring 8 is supported by a bearing 71 and may rotate around the axle 5. The clutch device according to the present invention consists of a clutch element having two portions, wherein one portion is provided on the clutch ring 8 and the other portion is provided on the driving gear 61 of the reduction mechanism 6 so that the clutch ring 8 may unite with the driving gear 61 as an integral whole in power transmission, or the clutch ring 8 may be separated from the driving gear 61 to stop power transmission. The above-mentioned clutch element may be controlled by a driving element, such as a steel pull wire 67 and a spring 66 as shown in FIGS. 1 and 2.

Nonetheless, the clutch element may also be constituted by a conventional electromagnetic clutch sheet. Then the cooperating driving element will be a power switch. The clutch element shown in FIGS. 1 and 2 is a mechanical structure, wherein the clutch ring 8 is supported by needle bearing 71 so that it may not only rotate around the axle 5 but also reciprocate in a direction parallel to the axis of the axle 5. A retainer 65 is disposed on the left side of the clutch ring 8 so that it may move axially with the clutch ring 8. Between the retainer 65 and the securing element 51 of the axle 5 is disposed a resilient element, such as a plurality of springs 66, so that, by means of the resilience thereof, the spring 66 may press the retainer 65 to move back to the right after it has moved to the left. In the preferred embodiment shown in FIGS. 1 and 2, one portion of the clutch element is constituted by a plurality of grooves 81 formed in a lateral side of the clutch ring 8, and the other portion thereof is constituted by a plurality of pins 611 formed on a lateral side of the driving gear 61; the grooves 81 and the pins 611 are coupled together in the conventional manner. In this embodiment, the driving element may be the steel pull wire 67 which may be operated manually, hydraulically or in any other manners. In addition, the left side of the clutch ring 8 is provided with a plurality of flanges 82 for reducing friction between the clutch ring 8 and the retainer 65. This is only a detail of the clutch device according to the present invention.

The above-described preferred embodiment is only for use in electric wheels. In the second preferred embodiment, the clutch device according to the present invention is adapted for use in bicycles to be coupled to the rear wheel of the bicycle so that the cyclist may choose to pedal with foot or employ the driving method of utilizing induction electromagnetic fields. As shown by imaginary lines in FIGS. 1 and 2, in one lateral side of the center of the outer wheel frame 12 is insertably provided an interfacial connector 7. The interfacial connector 7 is a conventional element. It is pivotally fitted on the axle 5 of the wheel so that the lateral side of the outer wheel frame 12 fits on a chain wheel 74 on the outer rim of the interfacial connector 7 to drive the outer wheel frame 12 in a single direction by means of the interfacial connector 7. In other words, the clutch device according to the present invention utilizes the batteries in the bicycle to supply power to the winding coils 4 in the outer wheel frame 12 to drive the bicycle. Alternatively, power supply to the winding coils is interrupted so that the bicycle has to be pedalled with foot to cause the chain wheel 74 to rotate and, through the interfacial connector 7 which transmit power in a single direction, drive the outer wheel frame 12. If batteries are used to drive the outer wheel frame 12 to rotate, electric currents flow through a wire 41 to carbon brushes 42 and then to the printed-circuit board 43. Subsequently, the conductive sheets 46 in the inner area of the printed-circuit board 43 transmit electric currents via the conductive sheets 47 in the outer area to the winding coils 4 in the inner wheel frame 11. After receiving power supply, the winding coils 4 generate a magnetic line, generating an induction electromagnetic field with the plurality of permanent magnets 22 on the stator 2. Since the stator 2 is fixed on the securing element 51 and remains immobile, the inner wheel frame 11 is pushed to rotate by the electromagnetic repulsion. After rotation, the winding coils 4 are continuously receiving power in the manner discussed above. If desired, the inner wheel frame 11 may be used to drive the outer wheel frame 12. As shown in FIG. 1, by releasing the pull wire 67 so that the the clutch element 81 and 611 of the clutch ring 8 disposed inside the interior of the inner wheel frame 11 and rotating therewith engage with each other to drive the driving gear 61. The power thus generated is transmitted via the idle gear 64 to the driven gear 62 in the interior of the outer wheel frame 12, causing the outer wheel frame 12 to rotate. If it is desired that the outer wheel frame 12 stops rotation, referring to FIG. 2, by pulling the pull wire 67 so that the clutch ring 8 and the inner wheel frame 11 moves to the left, the clutch elements 81 and 611 will become disengaged from each other so that transmission of power is prohibited. Certainly, the inner wheel frame 11 may be stopped from rotation simply by cutting off power supply from the batteries.

Although the present invention has been illustrated and described with reference to the preferred embodiment thereof, it should be understood that it is in no way limited to the details of such embodiment but is capable of numerous modifications within the scope of the appended claims.

What is claimed is:

1. A driving assembly for a motor wheel consisting of a hub rotating around an immobile axle for driving the wheel which is supported by said hub, said driving assembly comprises:

a stator provided on a securing element on said axle, said stator consisting of a plurality of permanent magnets of different polarities radially spaced apart in a direction parallel to said axle;

conductive elements axially fastened to said securing element on said axle, said conductive elements being parallel to said axle;

an annular printed-circuit board having an insulated body, said circuit board having two groups of conductive sheets respectively disposed in an inner area and outer area of one side of said printed-circuit board, each of said conductive sheets in said inner area being connected to any one of said group of conductive sheets in said outer area, and said group of conductive sheets in said inner area may be contacted by said conductive elements;

a wheel frame pivotally provided on said axle for use as said hub, said wheel frame having disposed therein a plurality of radially distributed winding coils corresponding to said permanent magnets to constitute a rotor in relation to said stator, each of said winding coils being connected to any one of said group of conductive sheets in said outer area of said printed-circuit board, said wheel frame being secured with said printed-circuit board so that they may rotate on said axle, and air currents generated during rotation rapidly dissipating heat of said winding coils within said inner wheel frame; and a power supply element disposed on said securing element on said axle for transmitting electric power from said conductive elements via said printed-circuit board to said winding coils in said inner wheel frame so that when said winding coils receive electric power, they may generate an electromagnetic field with said stator to drive said wheel frame to rotate around said axle;

Said wheel frame comprising an outer wheel frame and an inner wheel frame respectively pivotally connected to said axle, said inner wheel frame having disposed therein said plurality of winding coils, and said inner wheel frame being fixed with said printed-circuit board to rotate therewith, said outer wheel frame being used as a hub for supporting a wheel, and a reduction mechanism having a driving gear and an idle gear is disposed between one lateral side of said inner wheel frame and said outer wheel frame, said inner wheel frame transmitting power to said driving gear of said reduction mechanism, and said outer wheel frame being connected to said driven gear so that power generated during rotation of said inner wheel frame may be passed via said reduction mechanism to said outer wheel frame;

a clutch ring secured on said inner wheel frame, said clutch ring being pivotally connected to said axle around which said clutch ring may rotate;

a clutch element having one portion thereof connected to said clutch ring and the other portion thereof provided on said driving gear of said reduction mechanism so that said clutch ring may, by means of said clutch element, unite with said driving gear for transmitting power or disengage from said driving gear to stop power transmission; and a driving element for controlling said clutch element.

2. A driving assembly for a motor wheel as claimed in claim 1, wherein said clutch ring reciprocates along a direction parallel to said axial direction of said axle; a retainer adjacent to said clutch ring is provided for axial displacement with said clutch ring, and a resilient element is provided between said retainer and said securing element on said axle for pressing said retainer to reset after said retainer moves.

3. A driving assembly for a motor wheel as claimed in claim 1, wherein said driving element is a pull wire.

4. A driving assembly for a motor wheel as claimed in claim 1, wherein one portion of said clutch element is configured as grooves and the other portion thereof as pins.

5. A driving assembly for a motor wheel as claimed in claim 1, wherein an outer side of a central area of said outer wheel frame is insertably disposed a single rotational interfacial connector so that said outer wheel frame may be directly driven by said interfacial connector.

* * * * *